(12) United States Patent
Woods et al.

(10) Patent No.: US 11,745,447 B2
(45) Date of Patent: Sep. 5, 2023

(54) PLY TACKING DEVICES, SYSTEMS, AND METHODS

(71) Applicant: ROHR, INC., Chula Vista, CA (US)

(72) Inventors: Jeffrey D. Woods, Beaumont, CA (US); Daniel O. Ursenbach, El Cajon, CA (US); Michael Van Tooren, San Diego, CA (US); Jonathan S. Huang, Pasadena, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/556,248

(22) Filed: Dec. 20, 2021

(65) Prior Publication Data
US 2023/0191728 A1 Jun. 22, 2023

(51) Int. Cl.
*B29C 70/54* (2006.01)
*B29C 70/30* (2006.01)
*B29K 101/12* (2006.01)
*B29L 31/30* (2006.01)

(52) U.S. Cl.
CPC ............ *B29C 70/545* (2013.01); *B29C 70/30* (2013.01); *B29K 2101/12* (2013.01); *B29L 2031/3076* (2013.01)

(58) Field of Classification Search
CPC . B29C 66/65; B29C 66/81433; B29C 66/861; Y10T 156/1057; Y10T 156/1054
See application file for complete search history.

(56) References Cited

U.S. PATENT DOCUMENTS

| 2,545,243 | A | * | 3/1951 | Rumsey, Jr. | ........... B65D 75/10 156/87 |
| 2,974,717 | A | * | 3/1961 | Lindsay | ............... G03D 15/043 219/229 |
| 8,333,858 | B2 | | 12/2012 | Rubin et al. | |
| 11,052,494 | B1 | | 7/2021 | Bloch et al. | |
| 2021/0237372 | A1 | | 8/2021 | Ward | |

FOREIGN PATENT DOCUMENTS

| CN | 2076014 | 5/1991 |
| EP | 2724848 | 4/2014 |
| ES | 2724848 | 6/2017 |

OTHER PUBLICATIONS

European Patent Office, European Partial Search Report dated May 26, 2023 in Application No. 22215193.8.

* cited by examiner

*Primary Examiner* — Jeffry H Aftergut
(74) *Attorney, Agent, or Firm* — SNELL & WILMER L.L.P.

(57) ABSTRACT

A tacking device may comprise: a handle; a main body extending from a first end of the handle to a second end of the handle; and a plurality of soldering irons, each soldering iron in the plurality of soldering irons extending from a first side of the main body through the main body to a second side of the main body, each soldering iron in the plurality of soldering irons including a piercing end disposed on the second side of the main body.

16 Claims, 5 Drawing Sheets

PLY TACKING DEVICES, SYSTEMS, AND METHODS

FIELD

The present disclosure relates generally to thermoplastics manufacturing systems, methods and devices, and more specifically to a device and method for tacking of fiber-reinforced thermoplastic materials.

BACKGROUND

Various industries include components having multi-dimensional panels for various uses. For example, the aerospace industry utilizes nacelles for various applications for providing a protective housing around adjacent components as well as for providing an aerodynamic surface for reducing drag, among other applications. For example, a fan cowl is used for covering various components of a turbine engine and provides an aerodynamic surface for the turbine engine and related systems. A fan cowl outer skin is typically made from metal or carbon fiber thermoset composites. A current method of tacking plies together to form skins and/or stiffeners includes laying up thermoset composite plies and tacking together the laid up thermoset composite plies, all by hand, one at a time, to form a laminate structure, representing a time-consuming process.

SUMMARY

A tacking device is disclosed herein. The tacking device may comprise: a handle; a main body extending from a first end of the handle to a second end of the handle; and a plurality of soldering irons, each soldering iron in the plurality of soldering irons extending from a first side of the main body through the main body to a second side of the main body, each soldering iron in the plurality of soldering irons including a piercing end disposed on the second side of the main body.

In various embodiments, each soldering iron in the plurality of soldering irons are configured to be spring loaded in response to not being in use.

In various embodiments, the soldering iron is configured to provide heat in a local area of a plurality of plies of material during a tacking process.

In various embodiments, the tacking device further comprises a power source in electrical communication with a heating element in each soldering iron in the plurality of soldering irons.

In various embodiments, the tacking device further comprises a plurality of spring elements for each soldering iron in the plurality of soldering irons, each spring element in the plurality of spring elements disposed between a retention element and a surface of the main body.

In various embodiments, each soldering iron in the plurality of soldering irons comprises a piston head, a piston rod, and the piercing end. The piston rod may extend from the piston head through an aperture in the main body to the piercing end.

In various embodiments, the piston head is configured to abut a surface of the main body in response to the tacking device not being in use.

A tacking device is disclosed herein. The tacking device may comprise: a handle; a main body extending from the handle a first end of the handle to a second end of the handle, the main body comprising a first surface spaced apart from a second surface, the main body comprising a plurality of apertures extending through the first surface to the second surface; a plurality of spring elements; a plurality of retention elements; and a plurality of tacking elements, each tacking element in the plurality of tacking elements comprising: a piston head, a piercing end comprising a tip, and a piston rod extending from the piston head to the piercing end, the piston rod extending through an aperture in the plurality of apertures, a spring element in the plurality of spring elements disposed between a retention element in the plurality of retention elements and the second surface.

In various embodiments, each spring element in the plurality of spring elements is pre-loaded in response to the plurality of tacking elements not being exposed to an external force.

In various embodiments, each tacking element in the plurality of tacking elements is a soldering iron. The soldering iron may be electrically powered. The soldering iron may be gas powered.

In various embodiments, the plurality of tacking elements is oriented in a tacking pattern. The tacking pattern may be a grid pattern.

A method is disclosed herein. The method may comprise: simultaneously tacking together, at each of a plurality of local areas, a plurality of plies of material comprising thermoplastic resin and fiber; and in response to simultaneously tacking the plurality of plies of material, forming a first tacked area comprising a plurality of pierced local areas.

In various embodiments, the method may further comprise simultaneously tacking together, at each of a second plurality of local areas, the plurality of plies of material.

In various embodiments, the first tacked area includes a top surface of the plurality of plies of material, the top surface defining a contoured surface.

In various embodiments, the method further comprises tacking together a plurality of areas of the plurality of plies of material, each area in the plurality of areas including a grid pattern of pierced local areas. The method may further comprise: forming a skin in response to tacking together the plurality of areas; heating the skin; consolidating the skin; and cooling the skin after the consolidating to form a fiber-reinforced thermoplastic component.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
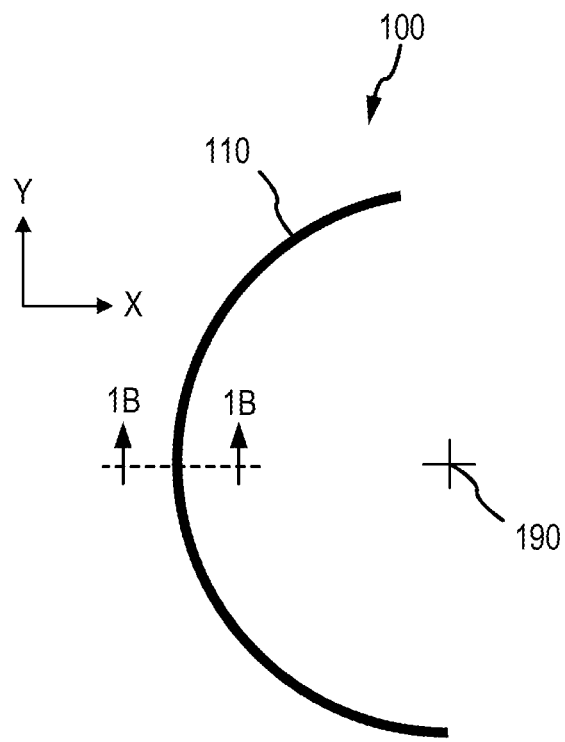
FIG. 1A illustrates a front-view profile of a stiffened panel half (such as for an aircraft nacelle fan cowl) having a semi-cylindrical geometry, in accordance with various embodiments.

The detailed description of exemplary embodiments herein refers to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Throughout this specification, reference is made to "melting temperature" and "recrystallization temperature" in respect of thermoplastics. It is understood that the terms are defined as follows:

"Melting temperature" is the temperature range at which the plastic undergoes a phase change from a solid to liquid, upon heating.

"Recrystallization temperature" is the temperature at which the semi-crystalline or crystalline matrix begins to form crystals upon cooling from the molten amorphous state. The onset of recrystallization from the molten state takes place over a temperature "window-range', which is dependent on the rate of cooling and the final achievable degree of crystallinity of the polymer matrix.

The thermoplastic tacking process, as described herein, may provide a relatively quick tacking process, e.g., by an order of magnitude relative to typical tacking processes. The thermoplastic tacking process, as described herein, may be utilized in a method of manufacturing a thermoplastic panel, such as the outer skin for a stiffened panel. The thermoplastic panel tacking process, as described herein, may provide an efficient tacking process for a thermoplastic panel with a relatively complex and/or large geometry.

The tacking device, as described herein, comprises a handle and a main body. The main body includes a plurality of soldering irons operably coupled to the main body. The plurality of soldering irons may be spaced about the main body in any pattern (e.g., a grid pattern, a honeycomb pattern, etc.). The tacking device, as described herein, may facilitate the efficient tacking process as described herein.

With reference to FIG. 1A, a stiffened panel half 100 is illustrated, in accordance with various embodiments. Stiffened panel half 100 may comprise an outer skin 110. Outer skin 110 may comprise a semi-cylindrical geometry when viewed from the aft direction, as shown in the illustrated embodiment. Outer skin 110 may define a centerline axis 190. Stated differently, outer skin 110 may be bent or curved around centerline axis 190.

Figure 1B:
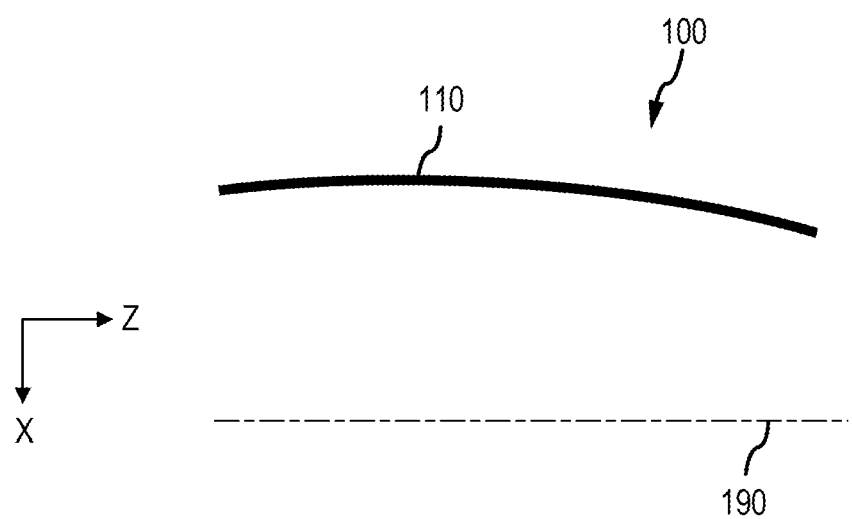
FIG. 1B illustrates a section view of the panel half of FIG. 1A having a rounded geometry, in accordance with various embodiments.

With reference to FIG. 1B, a section view of stiffened panel half 100 is illustrated, in accordance with various embodiments. Outer skin 110 may be contoured along the longitudinal direction (i.e., the Z-direction). Stated differently, outer skin 110 may comprise a non-linear geometry (e.g., rounded) along the longitudinal direction.

Outer skin 110 may be made from a fiber-reinforced thermoplastic material. In various embodiments, the outer skin 110 comprises a continuous reinforcing fiber and a thermoplastic resin. The reinforcing fiber to be used for the outer skin 110 has no particular limitations with respect to the type thereof, and examples thereof include metal fibers, such as an aluminum fiber, a brass fiber, and a stainless steel fiber, carbon fibers (including graphite fibers), such as polyacrylonitrile (PAN)-based carbon fibers, rayon-based carbon fibers, lignin-based carbon fibers, and pitch-based carbon fibers, insulating fibers, such as glass fiber, organic fibers, such as aramid fibers, polyparaphenylene benzoxazole (PBO) fibers, polyphenylene sulfide fibers, polyester fibers, acrylic fibers, nylon fibers, and polyethylene fibers, and inorganic fibers, such as silicon carbide fibers and silicon nitride fibers. Fibers prepared by applying surface treatment to these fibers are also available. Examples of the surface treatment include treatment with a coupling agent, treatment with a sizing agent, treatment with a binder, and adhesion treatment with an additive in addition to deposition treatment with conductive metal.

In the disclosure, the thermoplastic resin to be used for the outer skin 110 may be either crystalline or amorphous.

Examples of the crystalline thermoplastic resin include polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terphthalate (PTT), polyethylene naphthalate (PEN), and liquid crystal polyester. Examples of the polyolefin include polyethylene (PE), polypropylene (PP), and polybutylene. Examples of the polyarylene sulfide include polyphenylene sulfide (PPS). Examples of the fluororesin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAD, polyetherimide (PEI), polysulfone (PSU), polyether sulfone (PES), and polyarylate (PAR). The thermoplastic resin to be used for the outer skin 110 also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof.

Figure 2:
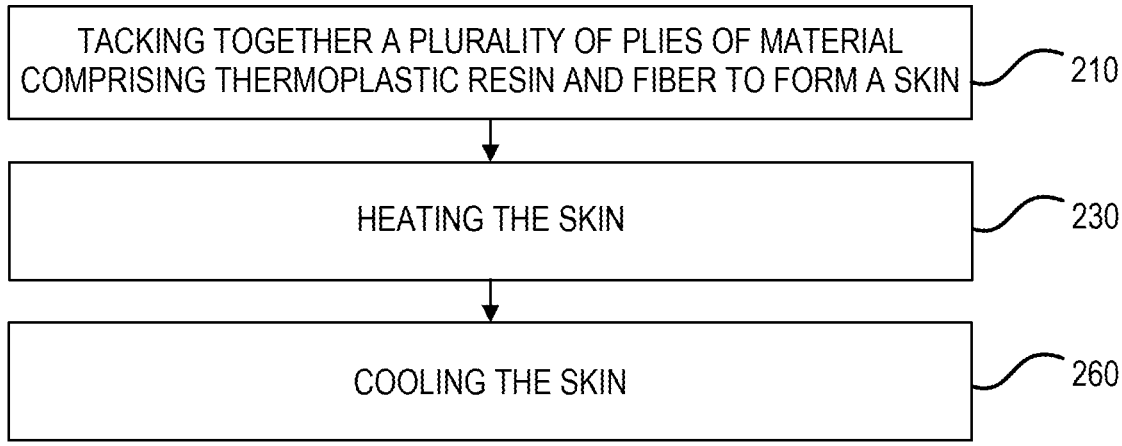
FIG. 2 provides a flow chart for a method for manufacturing a fiber-reinforced thermoplastic panel, in accordance with various embodiments.

With reference to FIG. 2, a method 200 for manufacturing a thermoplastic panel is provided, in accordance with various embodiments. Method 200 includes tacking together a plurality of plies of material comprising thermoplastic resin and fiber to form a skin (step 210). Method 200 includes heating the skin (step 230). Method 200 includes cooling the skin (step 260).

In various embodiments, the method 200 is not limited to any manufacturing process for thermoplastic components. For example, the tacking step 210 of method 200 may be utilized in any thermoplastic manufacturing process where a plurality of plies of material comprising thermoplastic resin and fiber is performed, such as a thermoforming process after tacking, stamp forming after tacking, over molding after tacking, insert molding after tacking, consolidation via a molding tool, or the like. Similarly, the tacking step 210 of method 200 may be utilized to form any fiber-reinforced thermoplastic component, such as a fan cowl, a control surface, an aircraft seat, or the like.

Figure 3A:
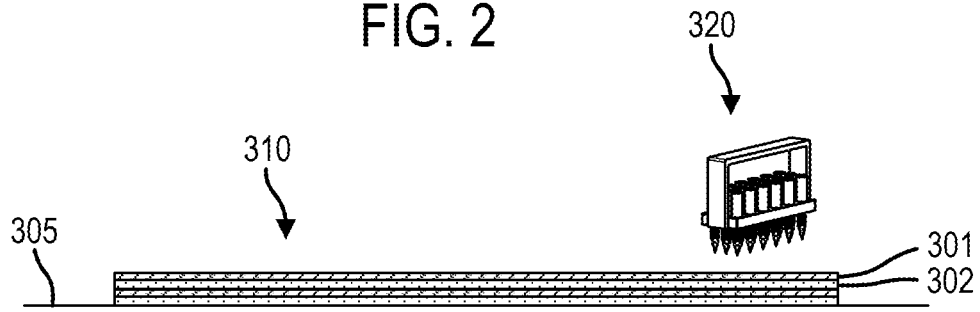
FIG. 3A illustrates various steps of the manufacturing process of FIG. 2, in accordance with various embodiments.
Figure 3B:
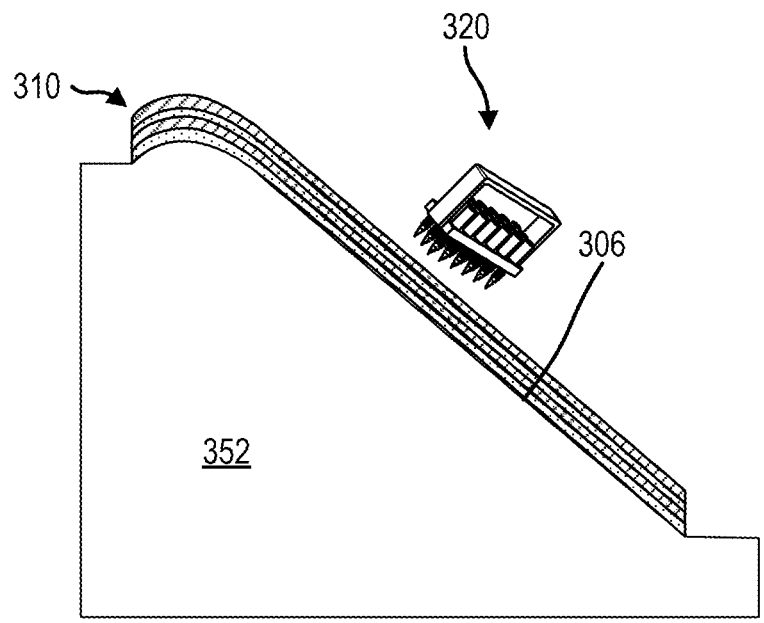
FIG. 3B illustrates various steps of the manufacturing process of FIG. 2, in accordance with various embodiments.

With combined reference to FIG. 2 and FIG. 3A, step 210 may include stacking plies of fiber sheets 301 and thermoplastic resin sheets 302 to a desired thickness to form a skin preform 310 (also referred to herein as a skin) and tacking the stack of fiber sheets 301 and thermoplastic resin sheets 302 together with a tacking device 320. In various embodiments, the stacking may be directly on a substantially planar surface 305 (as shown in FIG. 3A), directly on a contoured layup surface 306 (as shown in FIG. 3B), or the like. In various embodiments, the stacking may be performed on the substantially planar surface 305, tacked in accordance with tacking device 320, and laid up on a layup surface after tacking. The present disclosure is not limited in this regard.

In various embodiments, the resin sheets 302 may be "tacky" at a room temperature. Therefore, the resin sheets 302 may be "tacked" or stick to adjacent fiber sheets 301 without adding additional heat. In various embodiments, local heat may be applied to tack the resin sheets 302 and fiber sheets 301 together to form the skin preform 310. In this regard, the tacking device 320 comprise a plurality of soldering irons, as described further herein, to provide local heat. However, the present disclosure is not limited in this regard, and a tacking device without a heating element is within the scope of this disclosure.

Any number of plies of fiber sheets 301 and/or resin sheets 302 may be used depending on the desired thickness of the fiber-reinforced thermoplastic panel. Furthermore, the thickness of the panel may vary. In this regard, a first location of the panel may have a first number of plies and a second location of the panel may have a second number of plies, different from the first number of plies. After the skin preform 310 has been formed, the skin preform 310 may be transferred to a mandrel, transferred to a mold, or the like. The present disclosure is not limited in this regard.

Referring back to FIG. 2, step 230 may include heating, via one or more heating elements, the skin preform 310.

In various embodiments, the heating in step 230 may be locally heated to a sufficient forming temperature such that the skin preform 310 becomes pliable for roll forming purposes. In various embodiments, the term "forming temperature" as used herein may refer to a range of temperatures which is greater than the recrystallization temperature (or glass transition temperature for amorphous thermoplastic resins) of the thermoplastic resin of skin preform 310. The suitable pliable forming temperature may vary depending on the particular thermoplastic material being used, as well as other factors, such as the thickness of the panel. In various embodiments, the forming temperature is a temperature below the melting temperature, but not less than the recrystallization temperature (or glass transition temperature for amorphous thermoplastic resins) of the thermoplastic. In various embodiments, the forming temperature is a temperature above the melting temperature of the thermoplastic. In various embodiments, while the skin preform 310 is heated to the forming temperature, the skin preform 310 may be molded into various shapes via roller forming or the like.

In various embodiments, the heating in step 230 may be heating and pressurizing the skin preform 310 to a desired contour (e.g., via a mold 352 in FIG. 3B). In this regard the heating and pressure may consolidate the skin preform 310 into a fiber-reinforced thermoplastic composite, in accordance with various embodiments. In various embodiments, the heating in step 230 may include a combination of local heating for roller forming followed by roller forming to a desired shape, and heating and pressurizing to consolidate the skin preform 310 into a fiber reinforced thermoplastic composite. The present disclosure is not limited in this regard.

In various embodiments, step 260 may include cooling the skin preform 310 after consolidating and conforming the skin preform 310 to a temperature below a recrystallization temperature of the thermoplastic resin (e.g., room temperature) to form a hardened skin (i.e., a fiber-reinforced thermoplastic composite). In various embodiments, skin preform 310 is actively cooled. In various embodiments, skin preform 310 is passively cooled.

Figure 4:
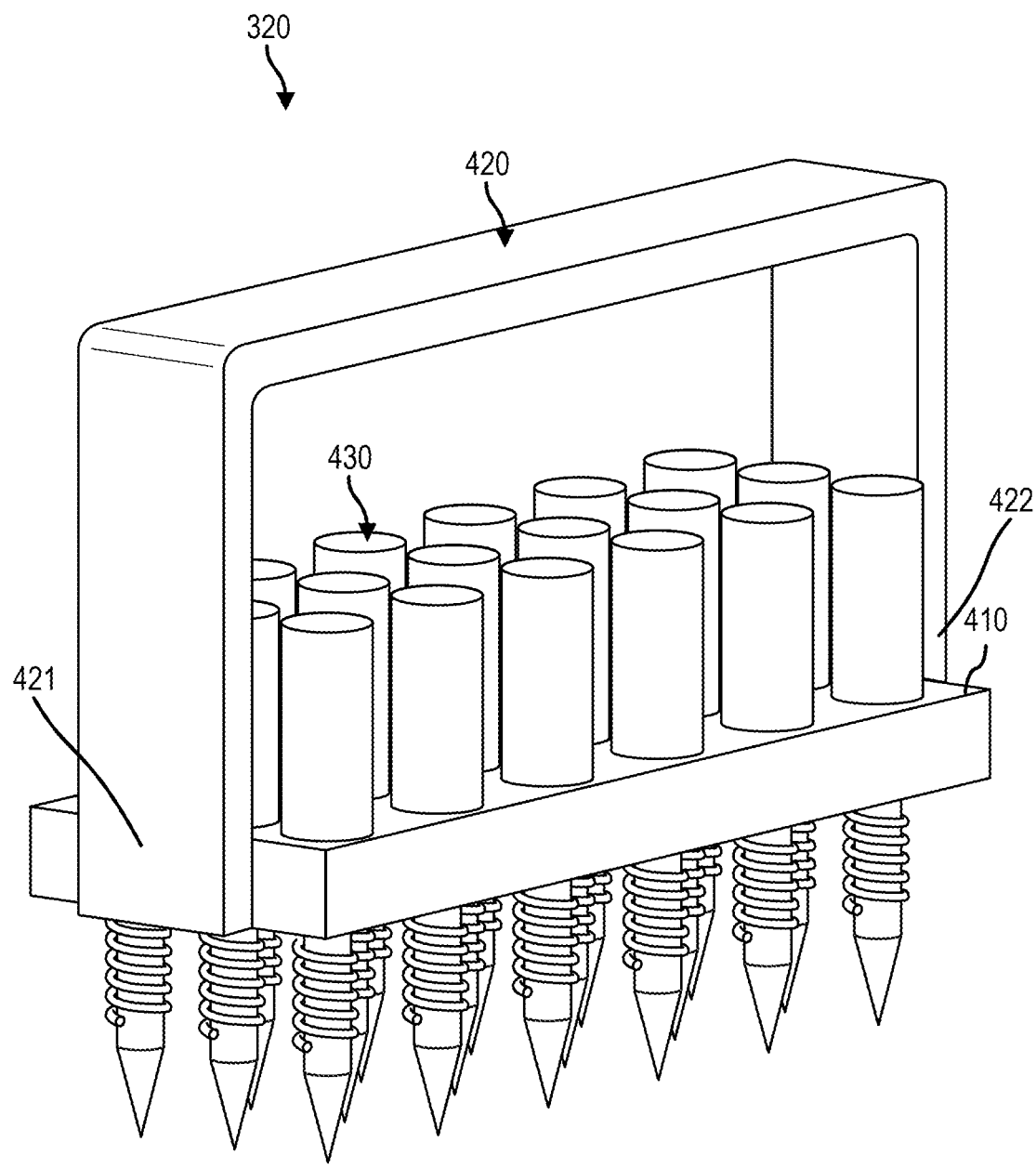
FIG. 4 illustrates a perspective view of a tacking device for use in the manufacturing process of FIG. 2.

Referring now to FIG. 4, a perspective view of the tacking device 320 from FIGS. 3A, 3B is illustrated, in accordance with various embodiments. The tacking device 320 comprises a main body 410, a handle 420, and a plurality of tacking elements 430. In various embodiments, the main body 410 extends from a first end 421 of the handle 420 to a second end 422 of the handle 420. In various embodiments, the main body 410 is cuboidal in shape, making the main body 410 simple to manufacture and providing a flat mating surface for engaging portions of the plurality of tacking elements 430 as described further herein.

In various embodiments, each tacking element 500 in the plurality of tacking elements 430 is a soldering iron. In this regard, the plurality of tacking elements 430 may be configured to supply local heat during a tacking step 210 of method 200 as outlined above. In various embodiments, the soldering iron may comprise an electrical soldering iron (e.g., through a resistive heating element), a gas powered soldering iron (e.g., heated by combustion of gas stored in a small tank, such as a catalytic heater), or the like. Any type of soldering iron is within the scope of this disclosure.

In various embodiments each tacking element 500 in the plurality of tacking elements 430 may be a simple tacking element configured for tacking at room temperature.

Figure 5:
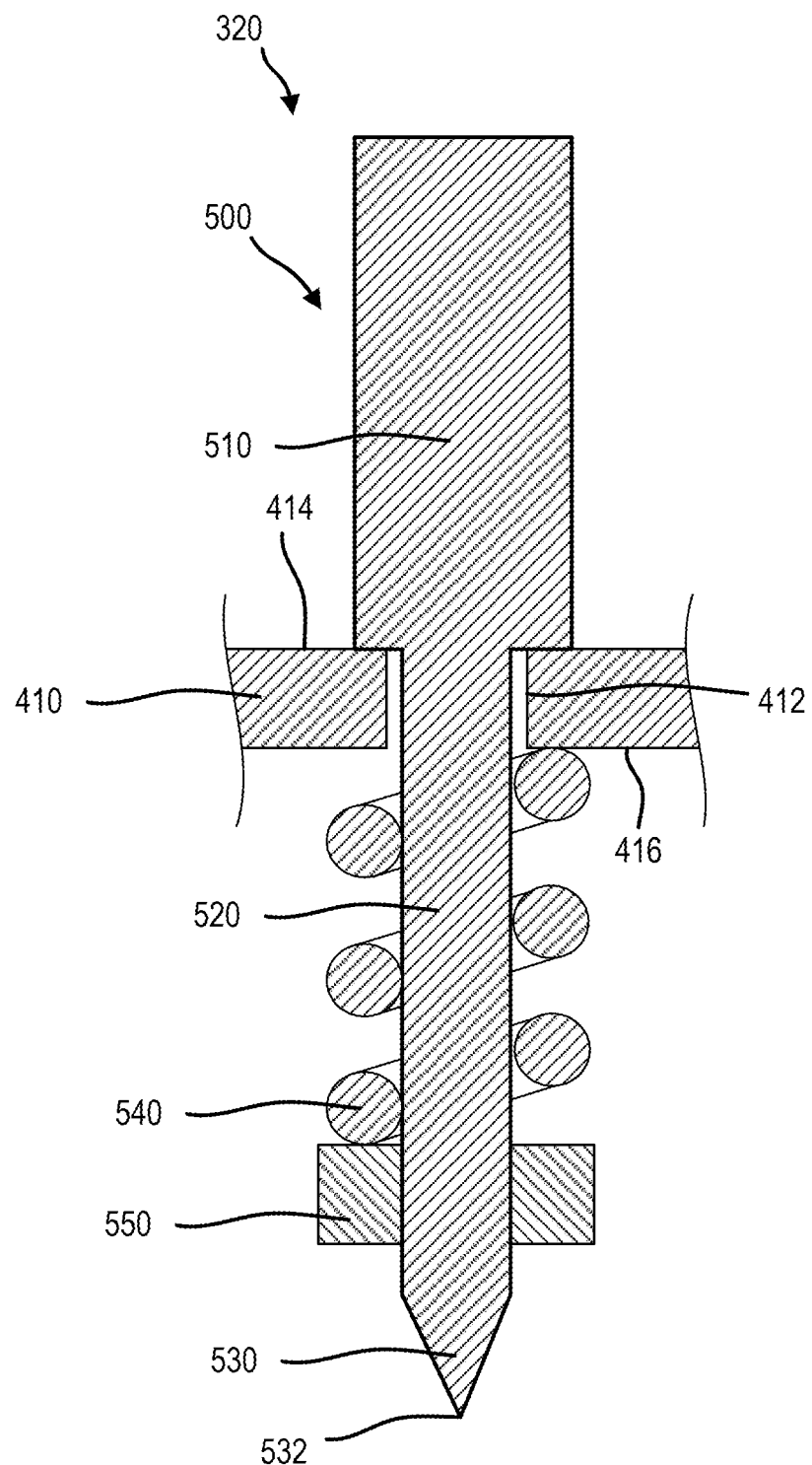
FIG. 5 illustrates a detail cross-sectional view of a portion of a tacking device during use in the manufacturing process of FIG. 2.

Referring now to FIG. 5, a detail view of the tacking element 500 in the plurality of tacking elements 430 from FIGS. 3A-B and 4 in a default state is illustrated, in accordance with various embodiments. The tacking element 500 comprises a piston head 510, a piston rod 520, and a piercing end 530. The piston rod 520 extends from the piston head 510 to the piercing end 530. In various embodiments, the tacking element 500 may house a power source (e.g., a battery, a gas tank, or the like) configured to power a heating element (e.g., a heater wire thermally coupled to the piston rod 520) of the tacking element 500. In various embodiments, the tacking device 320 from FIGS. 3A-B and 4 may have a single power source (e.g., a battery, a gas tank, or the like) for all tacking elements 500 in the plurality of tacking elements 430 from FIG. 4. The present disclosure is not limited in this regard.

In various embodiments, a "default state" as referred to herein is when there is no force exerted on the piercing end 530 of the tacking element 500. In various embodiments, the piercing end 530 comprises a tip 532 configured to pierce a stack of fiber sheets 301 and/or resin sheets 302 from FIGS. 3A-B during a tacking step 210 of method 200.

The piston rod 520 extends through an aperture 412 in the main body 410. The main body 410 defines a first surface 414 and a second surface 416. In various embodiments, the piston rod 520 is thermally conductive (e.g., metallic). In this regard, a heating element, such as a heater wire may be coupled to the piston rod 520. The piston rod 520 may be configured to transfer the heat from the heater wire to the piercing end 530 to apply heat locally during a tacking step 210 from method 200 described previously herein.

In various embodiments, a spring 540 is disposed axially (i.e., in a direction defined by a centerline of the piston rod 520), between a retention element 550 and the second surface 416 of the main body 410. Please note that spring 540 is not to scale and is illustrated as being larger for illustrative purposes. Various spring sizes and shapes may be utilized and are within the scope of this disclosure.

In various embodiments, in the default state, the piston head 510 abuts the first surface 414 of the main body 410. In this regard, the spring 540 may be configured to be pre-loaded (i.e., pre-loaded in compression) between the retention element 550 and the second surface 416 of the main body 410. Although described herein as being pre-loaded, the spring 540 may be in a neutral state or a near nature state in response to the tacking device 320 being in a default state. The present disclosure is not limited in this regard. In various embodiments, by preloading the spring 540, the tacking element 500 may be significantly more secure when being transported and when not in use relative to a neutral state of the spring 540, in accordance with various embodiments.

In various embodiments, the retention element 550 may comprise a nut. In this regard, assembly of the tacking element 500 in the tacking device 320 may be simplified. In various embodiments, the retention element 550 may be integrally formed with the piston rod 520 and the piston head 510 may be configured to be coupled to the piston rod 520 to facilitate assembly of the tacking element 500. The present disclosure is not limited in this regard.

Figure 6:
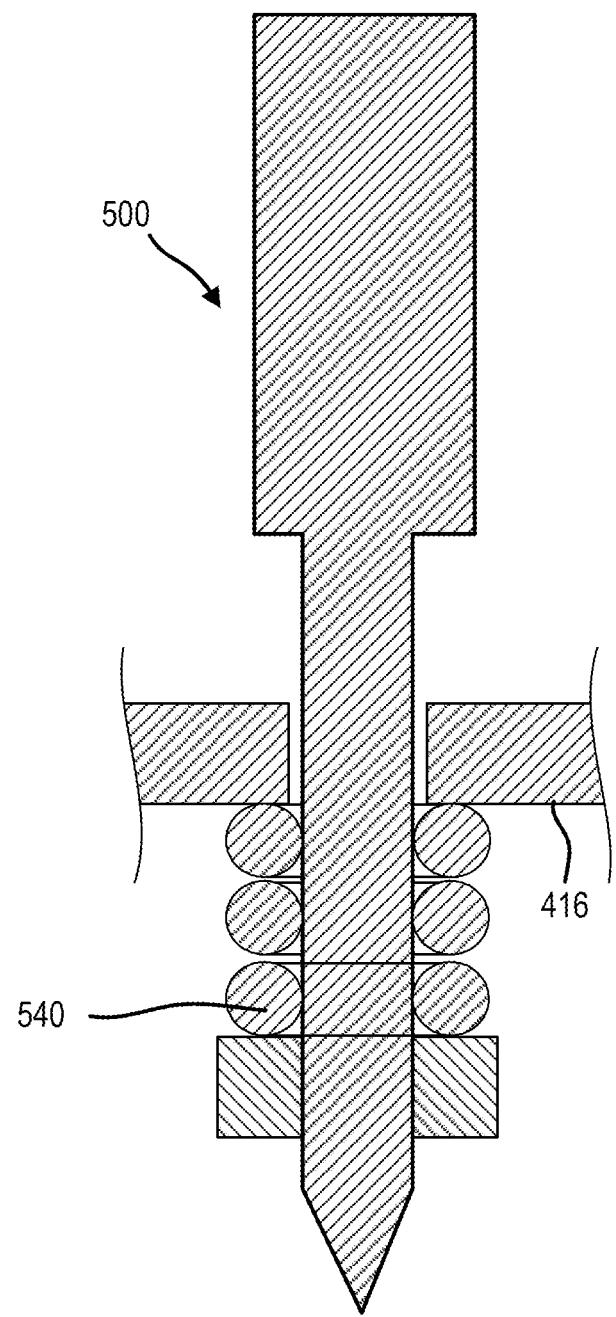
FIG. 6 illustrates a detail cross-sectional view of a portion of a tacking device during use in the manufacturing process of FIG. 2.

Referring now to FIG. 6, a cross-sectional detail view of the tacking element 500 in a fully loaded state is illustrated, in accordance with various embodiments. A "fully loaded state" as defined herein is when the spring 540 is compressed entirely (i.e., incapable of being compressed further). In various embodiments, with combined reference to FIGS. 4 and 6, the tacking device 320 disclosed herein facilitates a tacking of a stack of fiber sheets 301 and/or resin sheets 302 from FIGS. 3A-B during a tacking step 210 of method 200 due to each spring 540 associated with each tacking element 500 in the plurality of tacking elements 430 compresses locally. Thus, each spring 540 may compress a different amount and may be limited based on a minimum local distance between the second surface 416 of the main body 410 and a top surface of a stack of fiber sheets 301 and/or resin sheets 302 from FIGS. 3A-3B. Although compressing a different amount, an entire area of a stack of fiber sheets 301 and/or resin sheets 302 from FIGS. 3A-B may be tacked near simultaneously via the tacking device 320 compared to a single soldering iron, or other comparable tacking device, which would take an order of magnitude longer to tack the same area of the stack of fiber sheets 301 and/or resin sheets 302.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tacking device, comprising:
   a handle;
   a main body extending from a first end of the handle to a second end of the handle; and
   a plurality of soldering irons, each soldering iron in the plurality of soldering irons extending from a first side of the main body through the main body to a second side of the main body, each soldering iron in the plurality of soldering irons including a piercing end disposed on the second side of the main body, wherein each soldering iron in the plurality of soldering irons are configured to be spring loaded in response to not being in use.

2. The tacking device of claim 1, wherein each soldering iron in the plurality of soldering irons is configured to provide heat in a local area of a plurality of plies of material during a tacking process.

3. The tacking device of claim 1, further comprising a power source in electrical communication with a heating element in each soldering iron in the plurality of soldering irons.

4. The tacking device of claim 1, further comprising a plurality of spring elements for each soldering iron in the plurality of soldering irons, each spring element in the plurality of spring elements disposed between a retention element and a surface of the main body.

5. The tacking device of claim 1, wherein each soldering iron in the plurality of soldering irons comprises a piston head, a piston rod, and the piercing end.

6. The tacking device of claim 5, wherein the piston rod extends from the piston head through an aperture in the main body to the piercing end.

7. The tacking device of claim 6, wherein the piston head is configured to abut a surface of the main body in response to the tacking device not being in use.

8. A tacking device, comprising:
a handle;
a main body extending from the handle a first end of the handle to a second end of the handle, the main body comprising a first surface spaced apart from a second surface, the main body comprising a plurality of apertures extending through the first surface to the second surface;
a plurality of spring elements;
a plurality of retention elements; and
a plurality of tacking elements, each tacking element in the plurality of tacking elements comprising:
a piston head,
a piercing end comprising a tip, and
a piston rod extending from the piston head to the piercing end, the piston rod extending through an aperture in the plurality of apertures, a spring element in the plurality of spring elements disposed between a retention element in the plurality of retention elements and the second surface.

9. The tacking device of claim 8, wherein each spring element in the plurality of spring elements is pre-loaded in response to the plurality of tacking elements not being exposed to an external force.

10. The tacking device of claim 8, wherein each tacking element in the plurality of tacking elements is a soldering iron.

11. The tacking device of claim 10, wherein the soldering iron is electrically powered.

12. The tacking device of claim 10, wherein the soldering iron is gas powered.

13. The tacking device of claim 8, wherein the plurality of tacking elements is oriented in a tacking pattern.

14. The tacking device of claim 13, wherein the tacking pattern is a grid pattern.

15. A tacking device, comprising:
a handle;
a main body extending from a first end of the handle to a second end of the handle;
a plurality of soldering irons, each soldering iron in the plurality of soldering irons extending from a first side of the main body through the main body to a second side of the main body, each soldering iron in the plurality of soldering irons including a piercing end disposed on the second side of the main body; and
a power source in electrical communication with a heating element in each soldering iron in the plurality of soldering irons.

16. A tacking device, comprising:
a handle;
a main body extending from a first end of the handle to a second end of the handle; and
a plurality of soldering irons, each soldering iron in the plurality of soldering irons extending from a first side of the main body through the main body to a second side of the main body, each soldering iron in the plurality of soldering irons including a piercing end disposed on the second side of the main body, wherein each soldering iron in the plurality of soldering irons comprises a piston head, a piston rod, and the piercing end.

* * * * *